Aug. 22, 1939.  F. EMBERSON  2,170,517
CASH REGISTER
Filed July 26, 1933  8 Sheets-Sheet 1

INVENTOR
Frederick Emberson
BY
R. Madden
ATTORNEY

Aug. 22, 1939.   F. EMBERSON   2,170,517
CASH REGISTER
Filed July 26, 1933   8 Sheets-Sheet 2

INVENTOR
Frederick Emberson.
BY
R Hadden
ATTORNEY

Aug. 22, 1939.　　　F. EMBERSON　　　2,170,517
CASH REGISTER
Filed July 26, 1933　　8 Sheets-Sheet 3

INVENTOR
Frederick Emberson
BY
ATTORNEY

Aug. 22, 1939.  F. EMBERSON  2,170,517
CASH REGISTER
Filed July 26, 1933   8 Sheets-Sheet 4
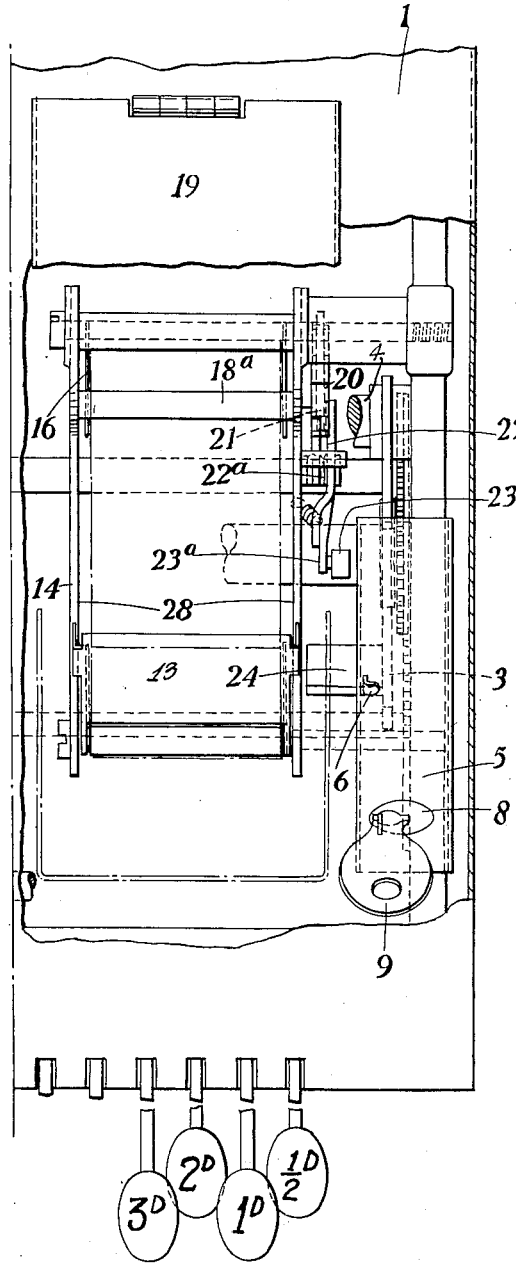
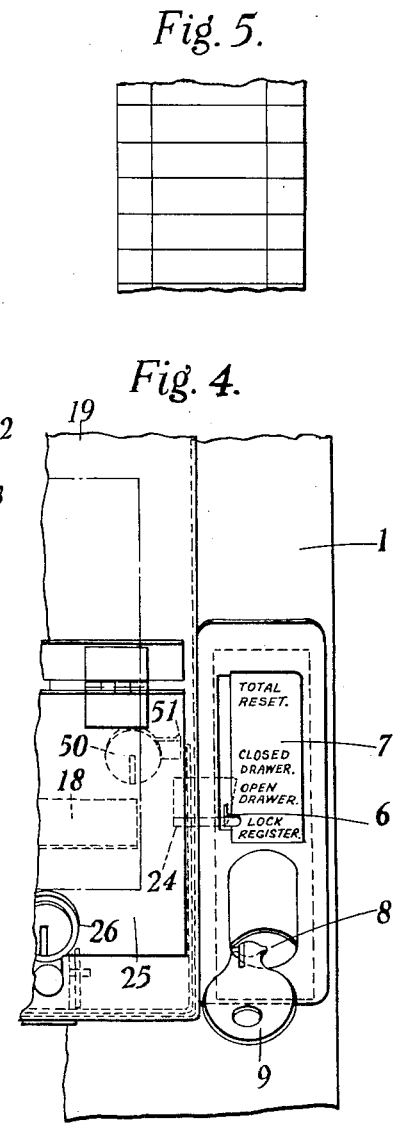
INVENTOR
Frederick Emberson.
BY
*R. Halliday*
ATTORNEY

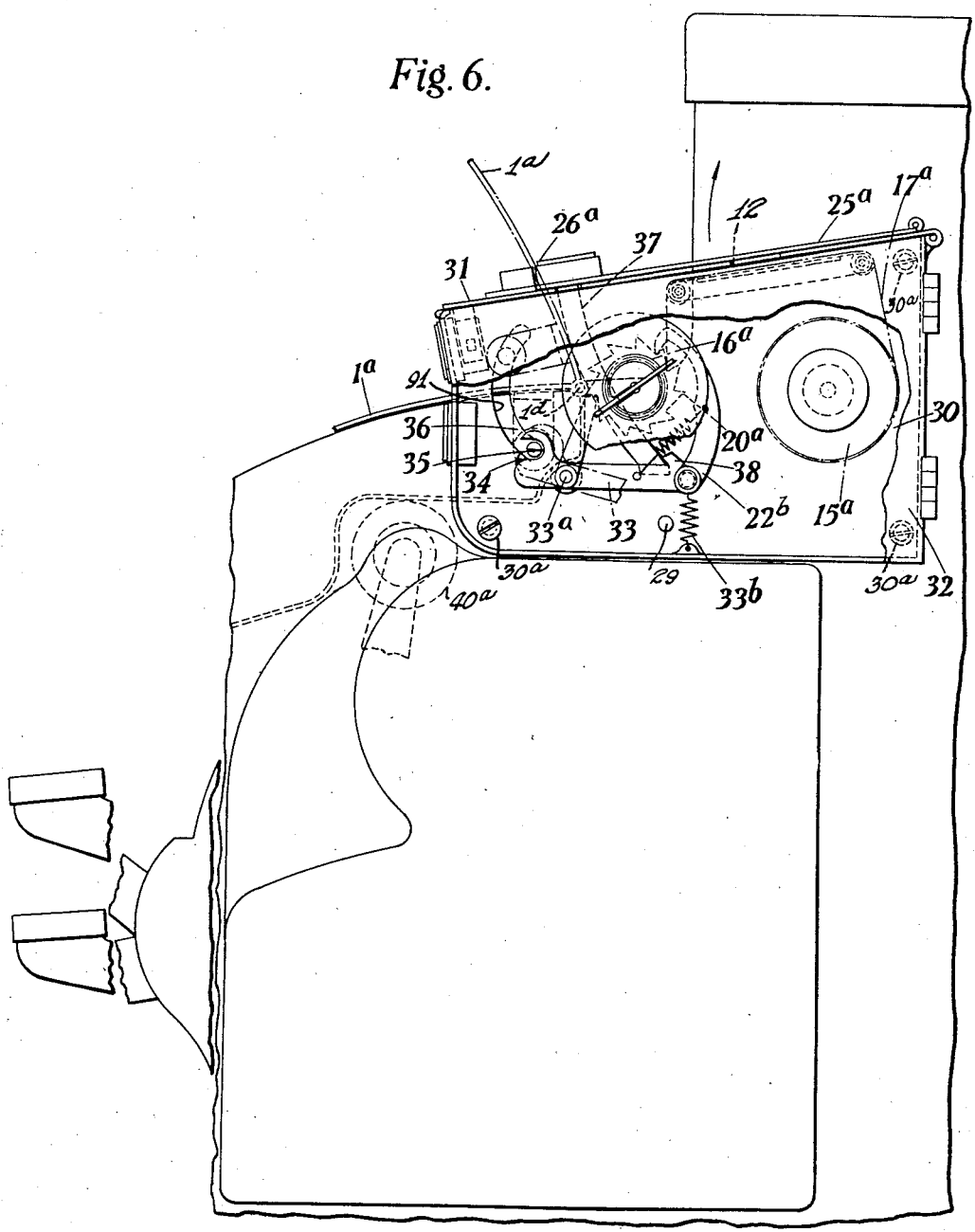

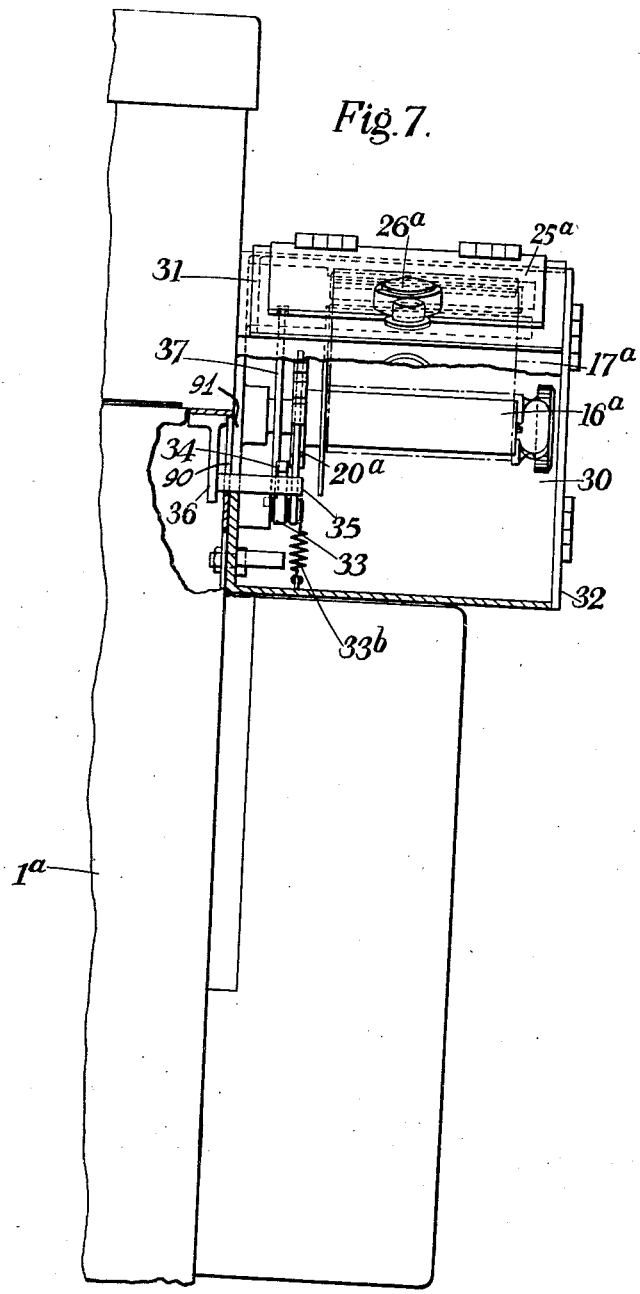

Aug. 22, 1939.　　　　　F. EMBERSON　　　　　2,170,517
CASH REGISTER
Filed July 26, 1933　　　　8 Sheets-Sheet 7
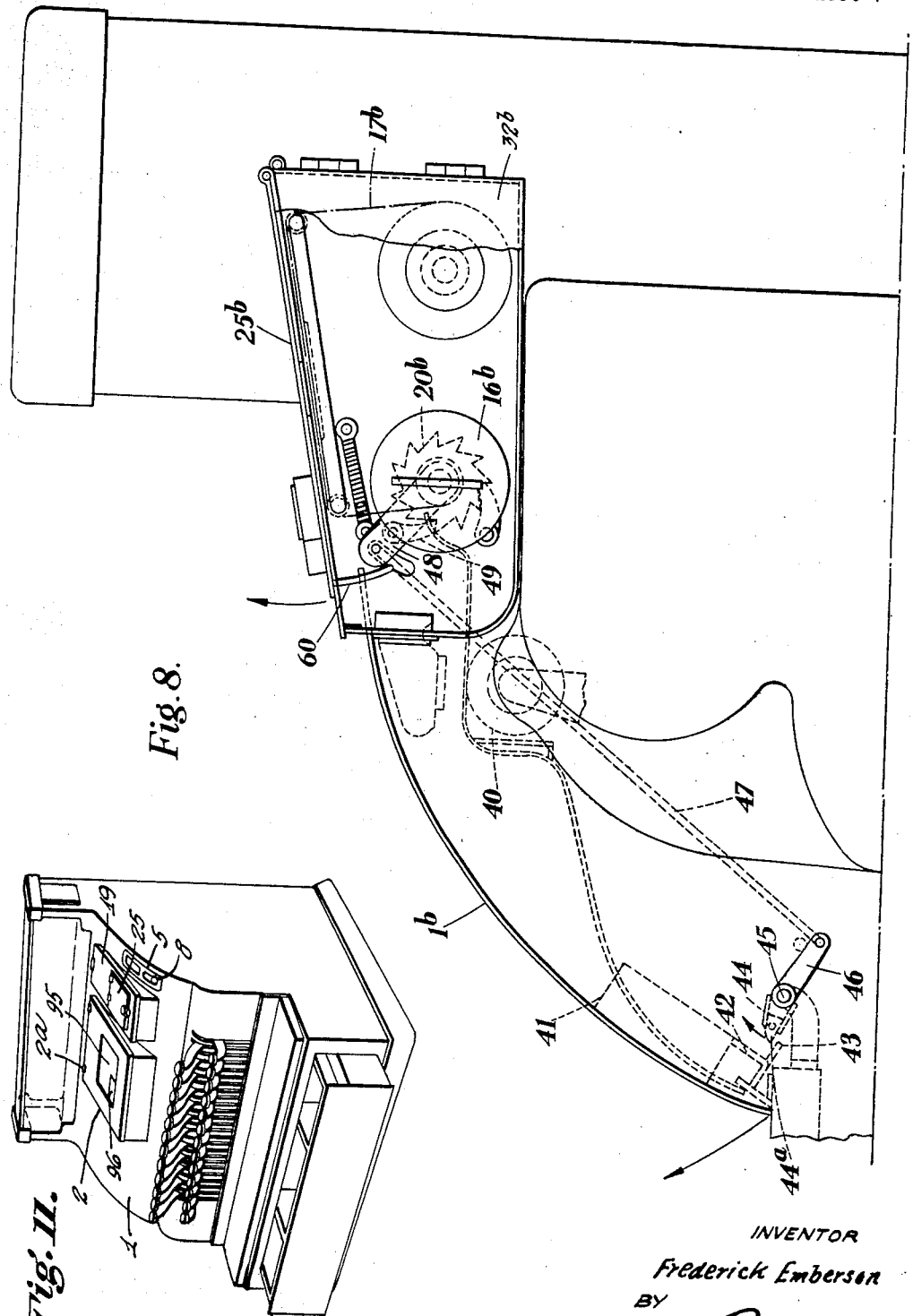
INVENTOR
Frederick Emberson
BY
ATTORNEY

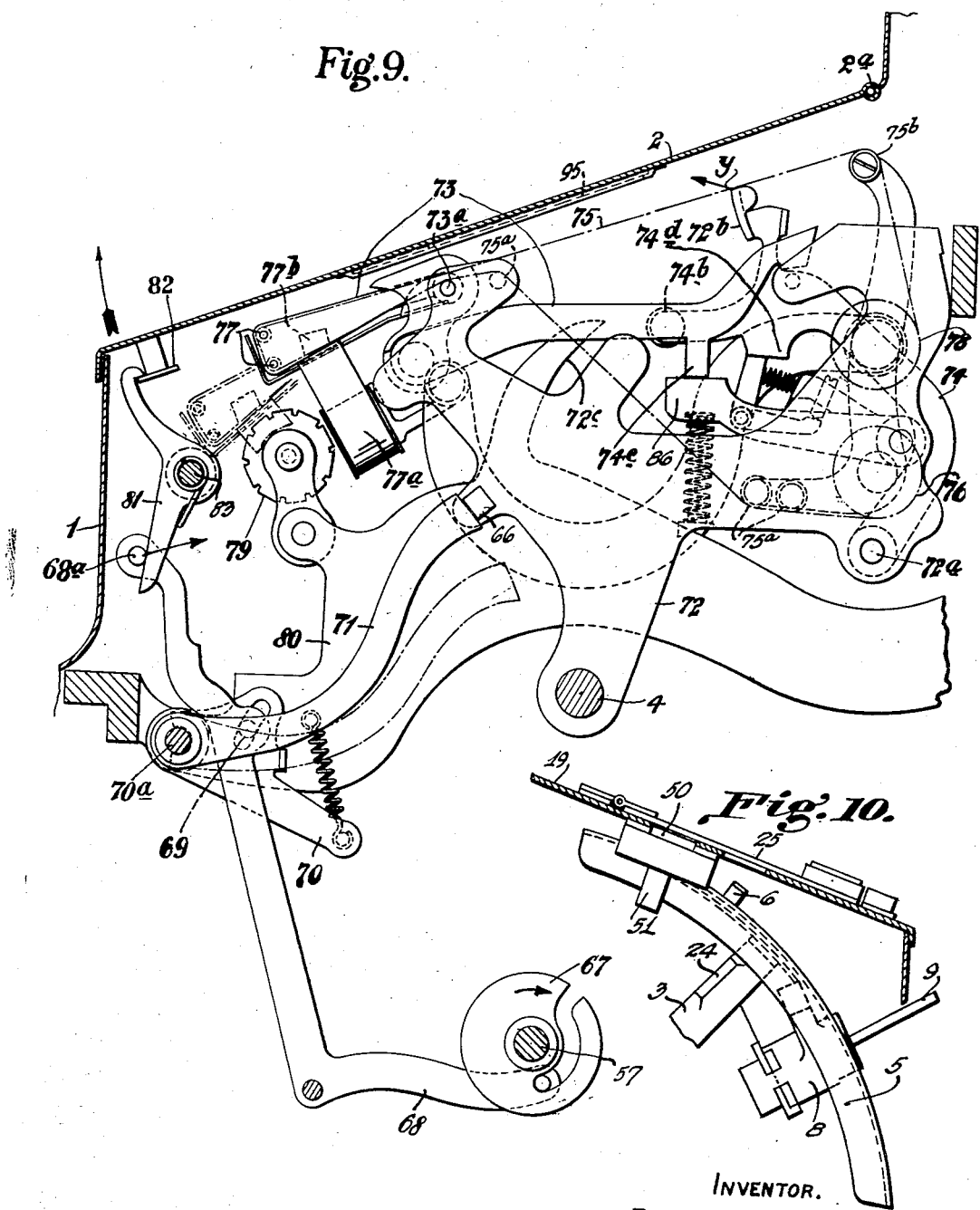

Patented Aug. 22, 1939

2,170,517

UNITED STATES PATENT OFFICE 2,170,517

CASH REGISTER

Frederick Emberson, Penge, London, England, assignor to The National Cash Register Company, Dayton, Ohio, a corporation of Maryland Application July 26, 1933, Serial No. 682,344
In Great Britain August 2, 1932

12 Claims. (Cl. 235—5)

This invention relates to improvements in cash registers and like machines, and particularly to an arrangement of mechanism for insuring the proprietor that he will obtain all the cash taken in during the course of a business period.

In some machines of the type to which the invention is shown applied, the total can be read from visual indicators set up by the totalizer, while in other machines, the total is printed on record material from which the total can be read. In both types of machines, access either to the total standing on the visual indicators, or to the total printing mechanism, is normally prevented by a locked lid or cover. In either of these machines, access to the total standing on the totalizer can be had by an authorized employee in possession of a key for unlocking the lid or cover.

With machines of this kind, there is a possibility of the proprietor being defrauded by the employee authorized to print or view the total, if for some reason there is more cash in the drawer than the total standing on the totalizer indicates. Such fraud is accomplished by first reading or printing the total from the totalizer, then counting the cash in the cash drawer and appropriating the excess amount of cash.

The object of the invention is to provide a safeguard against such fraudulent action.

It is a specific object of the invention to provide such machines with an autographic strip on which the person authorized to read or print the total standing on the totalizer should enter the amount of money found in the cash drawer before reading the total from the totalizer.

It is a further object of the invention to provide a feeding mechanism for an autographic strip, which feeding mechanism is actuated to feed the autographic strip far enough to render the entry made thereon inaccessible, when the total standing on the totalizer is rendered accessible by the key in possession of the authorized person.

It is a further object of the invention so to connect the autographic strip feeding mechanism with the lock for obtaining access to the total standing on the totalizer that the operation of the lock by the authorized person using his key will feed the autographic strip to move the entry made thereon past a window into an inaccessible and non-returnable position prior to determining the total standing on the totalizer.

It is a further object of the invention to provide machines having a total control lever with a stop to prevent moving the total control lever into total taking position until after the autographic strip is exposed, thus calling the attention of the employee to the fact that he should enter the amount of cash found in the cash drawer on the autographic strip before the total lever is moved into total taking position, and further to provide a means to feed the autographic strip by the total control lever while it is being moved from the stopped position into the total taking position.

It is a specific object of the invention to provide an autographic strip upon which the amount of cash found in the cash drawer is to be entered by the operator before printing or reading the total from the totalizer, together with feeding mechanism to line-space the autographic strip simultaneously with conditioning the machine for reading or printing a total from the totalizer, so that omission to enter the amount of cash found in the cash drawer before reading or printing said total will be indicated to the proprietor by the presence of a blank space on the autographic strip.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Figure 2:
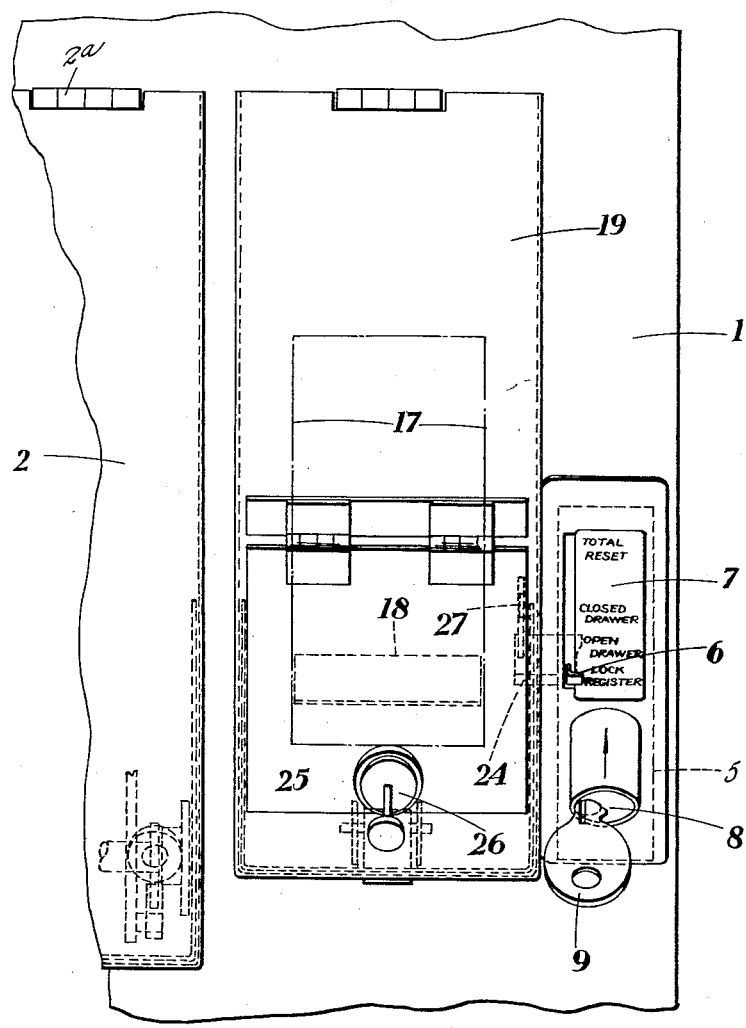
Fig. 2 is a top plan view of the mechanism shown in Fig. 1.
Figure 3:
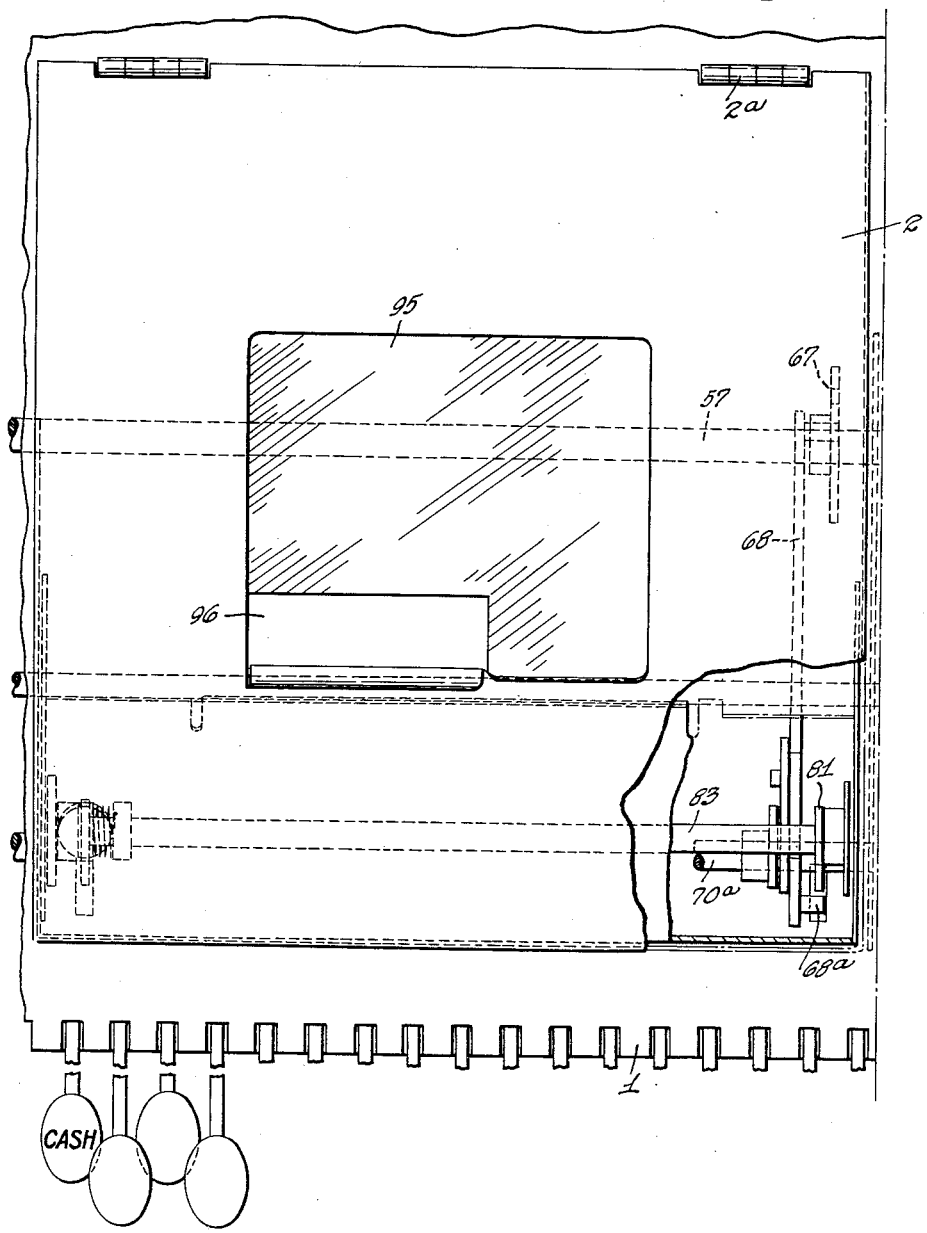
Fig. 3 is a top plan view of a well-known machine to which the invention is shown applied.

Fig. 3ª is a top plan view like Fig. 2, but with a part of the cabinet broken away to illustrate the mechanism thereunder.

Fig. 4 is a top plan view like Fig. 2, showing a modified form of a lock for the total control lever.

Fig. 5 shows a portion of the autographic strip.

Figure 1:
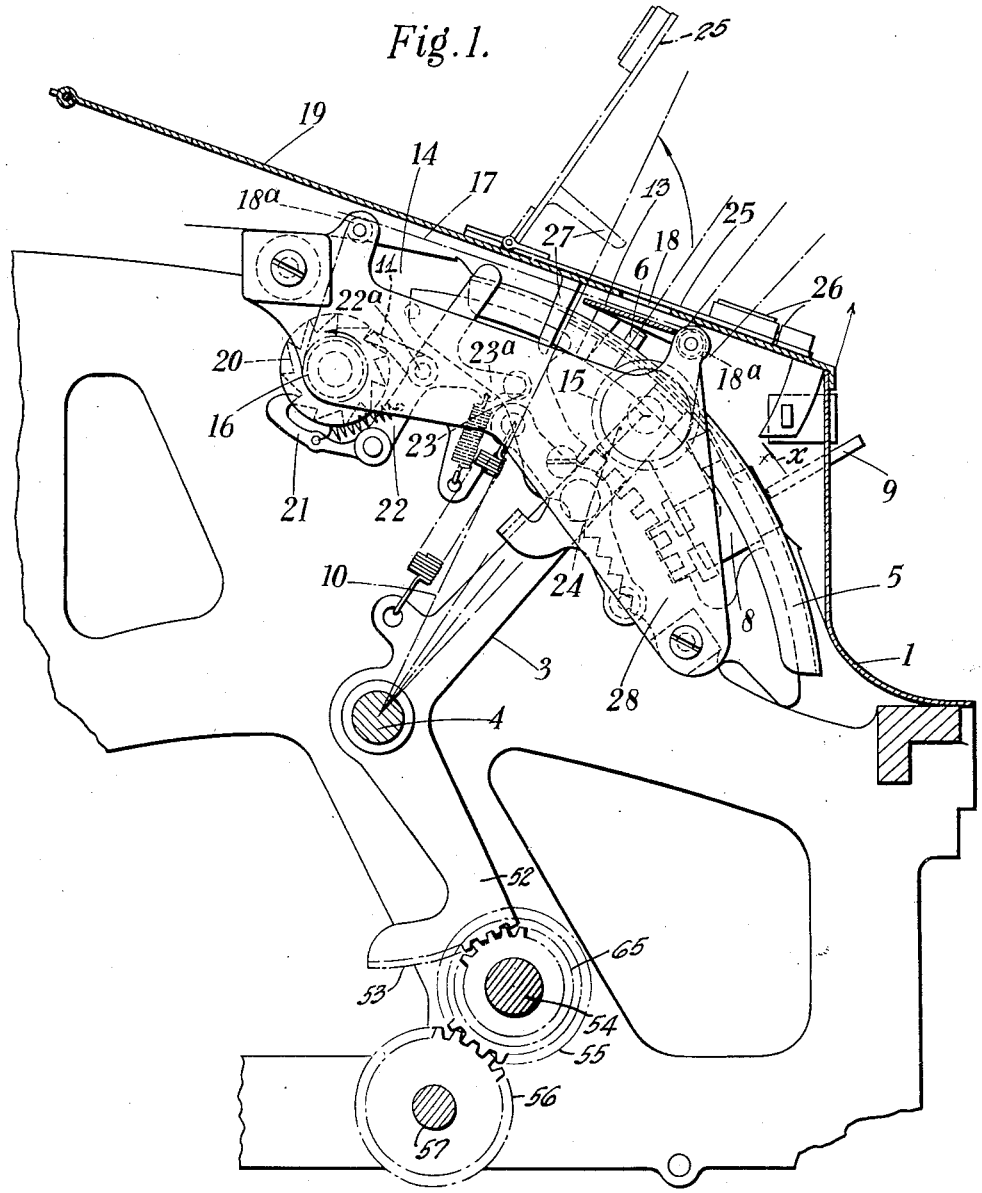
Fig. 1 is a side elevation of the elements comprising one form of the invention.

Fig. 6 is a side elevation of a form of the invention, modified to be applied to a machine different in construction from that shown in Figs. 1, 2, and 3.

Fig. 7 is a front elevation of the mechanism shown in Fig. 6.

Fig. 8 is another form of the invention, modified to be applied to a machine different in construction from that shown in Figs. 1, 2, 3, 6, and 7.

Fig. 9 is a cross-section through the machine shown in Figs. 1, 2, and 3, and is taken to the right of the print control section.

Fig. 10 is a detail view of the locking mechanism shown in Fig. 4.

Fig. 11 is a perspective view of the machine according to the form of the invention shown in Figs. 1, 2, and 3.

General description

The form of the invention illustrated in Figs. 1, 2, 3, 3a, 4, 9, and 11 is shown applied to a machine of the type shown and described in Letters Patent of the United States No. 1,742,701, issued to Frederick L. Fuller on January 7, 1930. In machines of this type, the total printing mechanism is under a lid which cannot be opened until a total control lever is moved from an add position into a total taking position. The invention, shown as being applied to such a machine, described generally, includes an autographic strip upon which the amount of cash found in the cash drawer of the machine is entered manually by an authorized employee. It is the intention that this amount be entered upon the autographic strip before a total of the amount standing on the totalizer is printed, so that the entry will be made before the employee is aware of what the total on the totalizer is. If the employee could read the total from the totalizer before making the entry, the employee could defraud the employer of the amount of cash in excess of the total standing on the totalizer, upon those occasions when an excess exists due to errors in setting up amounts on the keyboard during the course of a business period. To warn the operator, if he should forget to make the entry on the autographic strip, a stop is provided for the total control lever to prevent moving said lever into total taking position until after the autographic strip is exposed for receiving the entry. If the employee, either by accident or by intention, does not make the entry at the proper time, such failure will be made apparent by a blank space on the autographic strip. The blank space is obtained by automatically feeding the autographic strip one line-space by the total control lever when it is moved into total printing position. Thus, failure to make the entry on the autographic strip before printing the total is easily detected by the proprietor.

The invention can also be applied to machines having reading totalizers instead of total printing mechanism. In such machines, the reading totalizer is under a cover or lid, and before the total can be read it is necessary to raise the lid. Means is connected to the lid for line-spacing the autographic strip when the lid is raised to expose the totalizer. If the employee fails to make the proper entry on the autographic strip, a blank space on the autographic strip will be present, just as above pointed out.

Detailed description

Referring first to the construction shown in Figs. 1, 2, 3, 3a, 9, and 11, these views show the device forming the subject of the invention applied, by way of example, to a machine such as is shown and described in the above-named patent. The machine shown in this patent comprises means whereby the total cash of a day's transactions may be printed by operating a normally locked, or inaccessible, lever-controlled mechanism. The total printing lever is under the control of a lock carried by a total control lever 3 mounted to be moved to a certain position to unlock the total printing lever, and a lid 2 covering the same. The lid 2 (Figs. 2, 3, 9, and 11) is normally latched to prevent access to the total printing lever, in a manner hereinafter described. The machine shown is housed in a casing 1 (Fig. 11), and the total printing mechanism is disposed under the lid 2 hinged at 2a. The total control lever 3 (Fig. 1) is rotatable on a shaft 4 (Figs. 1, 3a, and 9) and carries at its upper end a slide 5 equipped with a pointer 6 which moves over a stationary index plate 7 when the lever 3 is moved. The lever 3 also carries, at its upper end, a lock 8. The bolt of lock 8 is provided to lock the total control lever 3 in its various positions. To give access to, and to permit the operation of, the printing mechanism, a key 9 is inserted into the lock 8 and the bolt of the latter is moved by said key to free the lever 3 for operation in the direction indicated by the arrow $x$ in Fig. 1. When the lever 3 reaches a definite position, indicated by the center line 10 in Fig. 1, the total printing mechanism and the lid 2 are unlocked to permit operation of the total printing lever and to give access to the printing mechanism.

The mechanism for unlocking the lid 2, and the total printing mechanism are old and well-known in the art, the printing mechanism being shown and described in the United States patent to Fuller No. 1,742,701, issued on January 7, 1930, and the unlocking mechanism being shown in the United States patents to Green, No. 1,842,546, issued on January 26, 1932 (see Fig. 4), and to Fuller, No. 1,883,894, issued October 25, 1932 (see Fig. 3). This mechanism is now briefly described.

The lever 3 has an arm 52 (Fig. 1) terminating in a toothed segment 53 meshing with a gear wheel 65 on a shaft 54 carrying a gear wheel 55 in mesh with a gear wheel 56 on a shaft 57 to which is fixed a cam 67 (Fig. 9) with which engages, by a pin-and-slot connection, one arm of a pivoted lever 68, the other arm of which has a pin-and-slot connection 69 with a spring-loaded arm 70 fixed to a rocker shaft 70a. To the latter is fixed a detent arm 71 normally coacting with a stud 66 to hold the total printing frame 72 (Fig. 9) in locked position. The printing mechanism, which is of well-known type (see Fuller 1,742,701, supra), comprises the frame 72 pivoted on shaft 4. A rockable frame 73 is pivoted on stud 73a at the upper end of the frame 72. A printing lever 74 is also pivoted on the frame 72, on a stud 72a, which lever is provided with a finger piece 72b. The total of the cash transactions is accumulated in the totalizer wheels 79, in the well-known manner. The totalizer wheels 79 are engraved with type characters and are mounted in the totalizer frame 80 in the usual manner.

The total standing on the totalizer wheels 79 is printed on a paper web 75, which passes from a supply reel 76 around three guide rolls 75a and over stud 73a, whence it is guided under a platen 77b carried by the forward end of the rockable frame 73. From under the platen 77b the paper web 75 is guided around rollers 77 on the rockable frame 73 and over a guide roller 75b to a receiving roll 78. The receiving roll 78 is given a step of rotation during each printing operation to line-space the printing, by mechanism not shown. A ribbon 77a is provided to make the prints on the paper web 75 visible.

The paper web 75 passes beneath a window 95 (Figs. 3 and 9) in the central part of lid 2, and also beneath a writing opening 96 formed in one corner of the window 95, through which any desired notations can be made on the paper web 75. The rockable frame 73 is provided with a writing table adjacent the opening 96.

The total printing mechanism is normally locked by the detent arm 71 in the path of stud 66, as above described.

To effect the unlocking of the total printing mechanism, the key 9 is inserted in the lock 8 and the bolt of the latter is operated by the key to disengage the lock bolt from a keeper in the well-known manner. The lock 8, together with the total control lever 3, is then manually advanced by said key in the direction indicated by the arrow $x$ in Fig. 1, so that the lever 3 is rocked to a definite position indicated by the center line 10 in Fig. 1. During such movement of the lever 3, the arm 52, by rotating gears 65, 55, and 56 and cam 67, rocks the lever 68 clockwise. The lever 68 in turn rocks, through the pin-and-slot connection 69, the arm 70 clockwise, so that the shaft 70$^a$ is rotated, and consequently the detent arm 71 fixed to said shaft 70$^a$ is swung downwards so that its free end is moved clear of the stud 66 on the rock frame 72. Thereafter the rock frame 72 may be manually rocked counter-clockwise by finger piece 72$^b$ to print the total. The total is printed by moving the finger piece 72$^b$ in the direction indicated by arrow $y$ (Fig. 9), so that the printing lever 74 and with it the rock frame 72 is rocked counter-clockwise about the shaft 4, until the platen 77$^b$ of frame 73 is positioned over the totalizer type wheels 79, as indicated in chain lines. During such rocking movement, the lever 74 is depressed by a roller 74$^b$ thereon engaging and rolling down an abutment face 72$^c$ until a projection 74$^d$ on arm 74 clears a projection on a spring-loaded hammer 86, whereupon the latter springs up and, striking a heel 74$^e$ on rock frame 73, causes the latter to rock counter-clockwise about stud 73$^a$, so that the ribbon, with paper web 75 above it, is pressed by platen 77$^b$ against the type wheels 79, whereby the total is recorded on said web.

In addition to, or instead of, unlocking the printing mechanism, the above unlocking mechanism may serve to unlock the lid 2 covering the printing mechanism. The lever 68 is provided with a pin 68$^a$ coacting with a spring-loaded latch 81 pivoted on shaft 83, and normally engaging a ledge 82 on the lid, so that when the lever 68 is rocked, as above described, it will unlatch the cover by rocking the latch 81 to disengage the ledge 82.

According to the invention there is mounted inside the casing 1 of the machine, adjacent the total control lever slide 5, the autographic device 14 comprising interconnected frame plates 28 carrying a supply roll 15 and wind-up roll 16 for an autographic strip 17, the latter passing over a table 13, guide rollers 18$^a$, and under a window 18 in a cover 19 hinged to the top of the casing 1. The wind-up roll 16 has connected thereto a ratchet wheel 20 with which coacts a pawl 21 carried by a lever 22 pivoted on stud 22$^a$. A roller 23, carried by an arm 23$^a$, is disposed in the path of a projection 24 on the lever 3, so that, as the lever 3 is moved in the direction indicated towards the unlocking position, the projection 24 strikes the roller 23 and rocks the lever 22. Consequently the pawl 21 will engage the ratchet wheel to feed the strip a step forward past the window 18. 11 designates a detent pawl pivoted on the stud 22$^a$, which also forms the pivot for lever 22. The pawl 11 is, therefore, adapted to prevent return movement of the ratchet wheel 20. The window is covered by a spring-loaded cover 25 hinged on the cover 19 and having a lock 26, and said cover 25 has on its under side a stop 27 which, with the cover 25 in closed position, is disposed in the path of the projection 24 on the member 3. The stop 27 is thus so disposed as to be contacted by projection 24 to arrest the movement of the lever 3 before it reaches the unlocking position indicated at 10, i. e., before the projection 24 on lever 3 strikes the roller on arm 23, the pawl only engaging the ratchet wheel to feed the strip a step forward past the window when the lever 3 is moved forward again after removal of the stop 27 by the lifting of the cover 25.

Thus, in moving the lever 3 by pushing the control key 9 towards the unlocking position, the movement of the said lever will be arrested when the projection 24 of the lever 3 strikes the stop 27 on the cover 25 and before the lever reaches the unlocking position, thus warning the operator that he should enter on the autographic strip 17 a notation of the amount of cash in the drawer. The operator then unlocks and opens the cover 25, so that the stop 27 is moved to inoperative position. The operator then writes on the strip, through window 18, the amount of cash found in the cash drawer and moves the key 9 farther forward, together with lever 3, to unlocking position, i. e., to the center line position 10 of lever 3, during which movement the notation on the strip is moved one step past the window to an inaccessible position by the pawl and ratchet gear, the cover being then allowed to close.

If the operator does not enter the amount of cash in the cash drawer onto the autographic strip 17 before he prints the total from the totalizer wheels 79 onto the web 75, a blank line on strip 17 will be fed into an inaccessible position, thus providing notice to the proprietor that the operator did not operate the machine properly. If, on the other hand, the operator does enter the amount of cash in the cash drawer onto the strip 17, then when the lever 3 is moved into total printing position, the entered amount is fed into an inaccessible position where he cannot alter the entry. If, in this case, more cash was found in the cash drawer than is shown by the total on the totalizer, the operator must nevertheless turn in the amount disclosed by his entry on the autographic strip.

Thus, by combining the novel autographic strip mechanism with the machine of the Fuller patent, supra, the owner can be assured that he will receive all the cash taken in by his employees in the course of any given business period.

The autographic strip reels are detachably mounted in any suitable manner inside the casing so that the strip may be readily removed for inspection and replacement, access being obtained by the normally locked cover 19. The strip is advantageously lined off into columns and horizontal divisions as shown in Fig. 5, and may have printed thereon the days of the week and dates opposite which the cash entries are made.

As an alternative to the stop 27 on the cover, there may be provided on the cover 19 a lock 50, as shown in Figs. 4 and 10, such lock being adapted to be unlocked by a special key in the possession of the operator. The lock has a bolt provided with a pendant end 51, normally positioned in the path of the projection 24 of lever 3, but adapted to be withdrawn from the path of the projection 24 by the operator's key. Such withdrawal of the pendant end 51 allows the operator to move the total control lever 3 to the position in which it effects the unlocking of the total printing mechanism and the lid 2, giving access to such printing mechanism, and at the same time line-spaces the autographic strip 17, as hereinbefore described.

Figs. 6 and 7 show the device according to the invention applied to a machine such as that shown in the United States patent to Von Pein, No. 1,763,915, issued June 17, 1930. In this patent, the lid 204 (Fig. 2) is the lid 1a of applicant's invention, and the totalizer wheels on shaft 57 are the totalizer 40a herein. Applicant's invention is attached to the outside wall of the cabinet of the Von Pein machine, adjacent the right-hand end of the lid 204, and an arm 36 is attached to the under side of the lid 204. A slot is cut in the right side of the cabinet of the Von Pein machine to permit a stud 35 on the arm 36 to project into a path of jaw 34. The details of construction of the connections between the Von Pein machine and applicant's device is later described.

In applicant's device, the lid 1a hiding the total counter is operatively connected with the winding-up mechanism of the autographic strip, by means of the arm 36 and the stud 35 thereon. Opening of the lid will, therefore, cause the strip to be fed a step forward to bring the amount thereon to an inaccessible and non-returnable position prior to the lid 1a reaching a position in which access is given to the totalizer to read or print the record. The lid 1a of the machine is hinged at 1d so that it may be lifted to the position indicated in chain lines to disclose a visual indicating total counter 40a housed in the cabinet of the machine beneath said lid.

The autographic device comprises a feed roll 15a and wind-up roll 16a for the paper strip 17a, the device being a separate unit housed in a cabinet 30 attached to the right side of the cabinet of the machine, externally, as by screws 30a. The strip 17a passes under a window 12 in the lid 31 of the cabinet 30, the latter having a normally locked door 32 to give access to the interior for the purpose of changing the strip. The wind-up roll has connected thereto a feed device with which coacts an arm carried by the lid 1a of the machine, so that, as the lid is raised, the wind-up roll is turned by the arm to feed the strip forward past the window 12. The feed device for this purpose comprises a ratchet wheel 20a with which coacts a pawl 22b carried by a rocker 33 pivoted on stud 33a and presenting a jaw 34 normally engaging with the stud 35 on an arm 36 carried by the lid 1a of the machine. The pin 35 extends through a slot 90 in the cabinet of the Von Pein machine and through a slot 91 in the cabinet 30, as shown in Fig. 7. When the lid 1a of the machine is raised to obtain access to the cash totalizer (see Fig. 2 of the Von Pein patent), the rocker 33 is rocked clockwise by stud 35, so that the autographic strip 17a is fed forward past the window 12. The rocker 33 is held in the rocked position by a spring 33b, indicated by chain lines in Fig. 6, until the lid is closed again, when the stud 35 engages with the jaw 34 and returns the rocker 33 to normal position. A limiting stud 29 (Fig. 6) limits the movement of rocker 33 by the spring 33b and maintains the jaw 34 in proper alinement with stud 35 after the stud is disengaged therefrom.

The window 12 is covered by a hinged cover 25a, normally locked by a lock 26a and presenting a projection in the form of a pendant arm 37 engaging at its outer end with an abutment in the form of a projection 38 on the rocker 33. The pendant arm 37 and abutment 38 are so relatively positioned as to arrest the opening movement of the lid 1a before the latter is sufficiently opened to give access to the totalizer, and the rocker 33 is arranged to operate the ratchet wheel 20a to feed the strip a step forward during the initial opening movement of the lid 1a, i. e., before the latter is sufficiently opened to give visual or operative access to the totalizer counter.

In attempting to open the lid 1a of the machine to read or print the total, the lid will be arrested by the pendant arm 37 on the cover 25a locking the rocker 33. Thus, when the operator is unable to open the lid 1a, he is reminded of the fact that he should enter on the autographic strip 17a a notation of the amount of cash in the cash drawer. The operator then unlocks and opens the cover 25a, which moves the pendant arm 37 to ineffective position. The notation of the amount of cash in the cash drawer is then entered on the autographic strip 17a and the lid 1a is lifted to give access to the totalizer thereunder. During this movement of the lid 1a, the notation on the strip 17a is moved a step forward past the window by the strip feed mechanism, the cover 25a being thereafter allowed to close.

Fig. 8 shows a device in which the strip is wound up by the act of unlocking the lid 1b. The autographic strip device may, as shown, be disposed in a casing mounted on the side of the Von Pein machine, as in Figs. 6 and 7. The lid 1b of the machine, normally preventing access to the totalizer 40, such as that shown in the Von Pein patent, above mentioned, is controlled by a lock 41 provided with a bolt 42. The bolt 42 is provided with a rearward extension 43 coacting with an arm 44 on a rocker shaft 45. An arm 46 is secured to the shaft 45 and is connected by a rod 47 to a rocker arm 48, carrying a pawl 49. The pawl 49 actuates a ratchet wheel 20b of the wind-up roll 16b of an autographic strip 17b. It will be seen that on withdrawal of the lock bolt 42, to allow the lid 1b to be lifted to give access to the totalizer, the arm 46 will be rocked clockwise and will, through rod 47, arm 48, and pawl 49, feed the strip 17b a step forward. To allow of return movement of the lock bolt to locking position, the arm 44 is provided with a spring trip nose, or by-pass pawl, 44a. A door 32b provides a means of access to the autographic strip 17b for removing said strip and for replacing a new strip.

Means is provided to prevent, as in the previous constructions, opening of the lid 1b prior to the opening of a cover 25b. This means comprises a detent 60 on the cover 25b normally disposed in the path of the pawl arm 48, said detent being raised to clear the arm 48 and thus allow of unlocking of lid 1b when the cover 25b is lifted.

The autographic devices according to the invention may, as previously stated, be in the form of separate units for attachment to existing machines (as in Figs. 6 and 8), or they may be embodied in the machine to form an integral whole therewith (as in Figs. 1 and 11). The examples hereinbefore described and illustrated are, however, particularly designed for application to existing machines with a minimum of structural alteration to the latter, and they are shown as applied to such machines.

While the forms of mechanism herein shown and described are admirably adapted to fulfill the objects primarily stated, it is to be understood that it is not intended to confine the invention to the forms or embodiments herein disclosed, for it is susceptible of embodiment in various other forms, all coming within the scope of the claims which follow.

What I claim as my invention and desire to secure by Letters Patent of the United States is:

1. In a cash register having a totalizer and a manually operated means normally effective to prevent disclosure of a total registered by said totalizer, the combination of feed means for an autographic strip; masking means for said strip, said masking means having a window to expose a limited area of said strip for making an entry thereon; a movable closure for said window, said closure being movable from a closed position into an open position to expose said window; means movable with the closure when the closure is opened to allow an operation of the manually operated means; and means operatively connecting said manually operated means with said strip feed means, and adapted to actuate the strip feed means to bring an entry on said strip past said window and into an inaccessible position after the closure for the window has been moved to open position to expose the window and prior to disclosure of a total upon operation of said manually operated means to ineffective position.

2. In a cash register having a totalizer and an openable cover normally closed to prevent disclosure of a total registered by said totalizer, the combination of lock mechanism adapted to normally restrain opening of said cover; feed means for an autographic strip; masking means for the autographic strip, said masking means having a window to expose a limited area of said strip for writing thereon; and means operatively connecting said lock mechanism with said strip feed means to actuate the feed means to bring the entry on the strip past said window prior to disclosure of a total following the unlocking of said lock mechanism.

3. In a cash register having a totalizer and an openable cover normally closed to prevent disclosure of a total registered by said totalizer, the combination of lock mechanism comprising a key-shifted lock member normally effective to prevent opening of said cover; feed means for an autographic strip; masking means for the autographic strip, said masking means having a window to expose a limited area of said strip to receive a written entry thereon; and means for transmitting movement of said lock member to said strip feed means to actuate the strip feed means so as to bring an entry on said strip past said window prior to the disclosure of a total by the opening of said cover after unlocking said lock mechanism.

4. In a cash register having a totalizer and an openable cover normally in closed position to prevent disclosure of a total registered by said totalizer, the combination of a strip feed means for an autographic strip; masking means for said strip, said masking means having a window to expose a limited area of said autographic strip for writing thereon; an openable lid to normally conceal the autographic strip; means on the lid to lock the cover in closed position when the lid is closed, and to unlock the cover when the lid is opened to expose the strip; and means normally connecting said cover with said strip feed means to actuate the strip feed means by movement of said cover to open position and immediately upon operation of the cover to thereby bring an entry on said strip past said window prior to the disclosure of the total on the totalizer.

5. In a cash register having a totalizer and an openable cover normally closed to prevent disclosure of a total registered by said totalizer, the combination of a feed means for an autographic strip comprising a take-up reel and a ratchet-and-pawl mechanism adapted to rotate said take-up reel stepwise; masking means for the autographic strip, said masking means having a window to expose a limited area of said strip to enable written entries to be made thereon; a lever carrying said pawl; and a pin on said cover engaging with said lever when the cover is closed and adapted, upon initial movement of the cover, to rock the lever to feed said strip to bring an entry thereon past said window prior to disclosure of a total on said totalizer by operation of said cover to open position.

6. In a cash register having a totalizer and an openable cover normally closed to prevent disclosure of a total registered by said totalizer, the combination of strip feed means for an autographic strip comprising a take-up reel and a ratchet-and-pawl mechanism adapted to rotate said take-up reel step-by-step; masking means for said autographic strip, said masking means having a window to expose a limited area of the strip to enable written entries to be made thereon; a lever carrying said pawl; a pin on said cover engaging with said lever and adapted to rock the latter to feed said strip to bring an entry thereon past said window prior to disclosure of a total on said totalizer by operation of said cover to uncovering position; a hinged cover over said window; and a detent arm on said hinged cover normally effective to lock said ratchet-and-pawl mechanism but moved to ineffective position by the opening of said hinged cover.

7. In a cash register having a totalizer, an openable cover normally closed to prevent disclosure of a total registered by said totalizer, a lock mechanism to normally lock said cover in closed position and including a hand-operated lock lever, and a key-controlled lock for holding said lock lever in locking position, the combination of strip feed means for an autographic strip comprising a take-up reel and ratchet-and-pawl mechanism to rotate said take-up reel stepwise; masking means for said strip; a window in said masking means to expose a limited area of said strip to enable written entries to be made thereon; a projection on said lock lever; and a second lever operatively connected with said pawl and disposed in the path of said projection, said projection being adapted to engage said second lever on movement of said lock lever to unlocking position and thereby actuate said pawl to feed said strip to bring an entry thereon past said window prior to said lock lever reaching its unlocking position.

8. In a cash register having a totalizer, an openable cover normally closed to prevent disclosure of a total registered by said totalizer, lock mechanism to normally lock said cover in closed position and including a hand-operated lock lever, and a key-controlled lock for holding said lock lever in locking position, the combination of means comprising a take-up reel and ratchet-and-pawl mechanism to rotate said take-up reel step-by-step; masking means for said strip; a window in said masking means to expose a limited area of said strip to enable making written entries thereon; a projection on said lock lever; a second lever operatively connected with said pawl and disposed in the path of said projection, said projection engaging said second lever upon movement of said lock lever to unlocking position and to thereby actuate said pawl to feed said strip to bring an entry thereon past said window prior to the unlocking of said cover by said locking lever; a hinged cover over said window openable to expose said window; and a detent on said hinged cover normally in position to block complete movement of said lock lever to unlocking position, said detent being movable out of blocking position by the opening of said hinged cover to uncover said window.

9. In a machine of the class described provided with a totalizer containing a normally inaccessible total, and means operable to render the total accessible, the combination of feeding means for an autographic strip; a lid to normally conceal the autographic strip; means controlled by the lid to control the operation of the first-named means; and connections between the feeding means and the first-named means to enable the first-named means to operate the feeding means to feed the autographic strip whenever the first-named means is operated.

10. In a machine of the class described, having a totalizer, means to print a total from the totalizer onto a detail strip, and control means to normally prevent printing a total from the totalizer onto the detail strip, the combination of masking means provided with an opening to expose a limited area of an autographic strip to enable written entries to be made thereon; feed means for the autographic strip; and means, including connections to actuate the feed means, and connections to control the preventing means to enable the printing of a total on the detail strip after the exposed area of the autographic strip has been fed from the opening into a position under the masking means to thereby prevent alteration of the written entry from being made after the total is printed.

11. In a machine of the class described having a totalizer, means to print a total from the totalizer onto a detail strip, and control means to normally prevent printing a total from the totalizer, the combination of masking means provided with an opening to expose a limited area of an autographic strip to enable written entries to be made thereon; feed means for the autographic strip; and means operated by the control means to actuate the feed means to feed the autographic strip prior to an operation of the total printing means.

12. In a machine of the class described, having an amount manifesting device, and a lid normally preventing access to said manifesting device, said lid being movable to allow access thereto, the combination of a closure normally preventing access to an autographic strip and shiftable to allow entries to be made on said strip; means moved by the autographic strip closure when it is shifted to allow access to the strip and cooperable with the first-mentioned lid to prevent movement of the first-mentioned lid until after the autographic strip closure has been shifted, whereby access to the amount manifesting device is prevented until after the autographic strip closure has been shifted to allow access to the autographic strip; and means to line-space the autographic strip before access is had to the amount manifesting device.

FREDERICK EMBERSON.